US007113598B2

(12) United States Patent
Flusberg et al.

(10) Patent No.: US 7,113,598 B2
(45) Date of Patent: Sep. 26, 2006

(54) METHODS AND SYSTEMS FOR HIGH-DATA-RATE QUANTUM CRYPTOGRAPHY

(75) Inventors: Allen M. Flusberg, Newton, MA (US); Jonah H. Jacob, Brookline, MA (US); Martin A. Jaspan, Somerville, MA (US); Israel Smilanski, Cambridge, MA (US)

(73) Assignee: Science Research Laboratory, Inc., Somerville, MA (US)

( * ) Notice: Subject to any disclaimer, the term of this patent is extended or adjusted under 35 U.S.C. 154(b) by 0 days.

(21) Appl. No.: 10/844,903

(22) Filed: May 13, 2004

(65) Prior Publication Data
US 2004/0250111 A1 Dec. 9, 2004

Related U.S. Application Data

(60) Provisional application No. 60/470,372, filed on May 14, 2003.

(51) Int. Cl.
*H04K 1/00* (2006.01)

(52) U.S. Cl. .................. 380/256; 380/277; 380/278; 380/263; 380/283

(58) Field of Classification Search ........... 713/200; 380/277, 278, 256, 263
See application file for complete search history.

(56) References Cited

U.S. PATENT DOCUMENTS

| 5,307,410 | A |   | 4/1994  | Bennett ............... 380/21 |
| 5,675,648 | A | * | 10/1997 | Townsend ............. 380/278 |
| 5,764,765 | A | * | 6/1998  | Phoenix et al. ........ 380/283 |
| 5,850,441 | A | * | 12/1998 | Townsend et al. ...... 380/283 |
| 6,188,768 | B1 |  | 2/2001  | Bethune et al. ........ 380/278 |
| 6,289,104 | B1 | * | 9/2001  | Patterson et al. ....... 380/283 |
| 6,438,234 | B1 | * | 8/2002  | Gisin et al. ............ 380/256 |
| 6,895,092 | B1 | * | 5/2005  | Tomita ................. 380/278 |
| 2002/0191176 | A1 | * | 12/2002 | Saleh et al. ........... 356/73.1 |
| 2004/0109564 | A1 | * | 6/2004  | Cerf et al. ............. 380/256 |
| 2004/0161109 | A1 | * | 8/2004  | Trifonov ............... 380/277 |
| 2004/0184603 | A1 | * | 9/2004  | Pearson et al. ......... 380/28 |
| 2005/0094818 | A1 | * | 5/2005  | Inoue et al. ........... 380/278 |

OTHER PUBLICATIONS

Fitch, M.J., Donegan M.M., Jacobs, B.C., Pittman, T.B., and Franson, J.D., "Improved single-photon detector performance", Jun. 2003, Quantum Electronics and Laser Science, 2003. QELS. Postconference Digest, pp. 2 pp.*

(Continued)

*Primary Examiner*—Christopher Revak
*Assistant Examiner*—Kaveh Abrishamkar
(74) *Attorney, Agent, or Firm*—Burns & Levinson LLP; Jerry Cohen; Orlando Lopez

(57) ABSTRACT

Methods and systems enabling enhanced bit-rate QKD fiber-based key delivery. In one embodiment, a secure communications network of this invention includes a number of communication nodes, each of the communication nodes being connected to a quantum channel. At least one of the communication nodes (a sending node) includes a multiplexing system capable of assembling a succession of substantially single photons in a predetermined order. At least another of the communication nodes (a receiving node) includes a receiving system capable of receiving at least some of the assembled succession of substantially single photons, a demultiplexing system capable of separating the received assembled succession of substantially single photons into a number of separated successions of substantially single photons, and, a number of detector systems, each one of the detector systems being capable of detecting one separated succession of the successions of substantially single photons.

20 Claims, 6 Drawing Sheets

OTHER PUBLICATIONS

Ribordy, G., Gisin, N., Guinnard, O., Zbinden, H., "Single-Photon Detection at Telecom Wavelength and Quantum Cryptography", 2003, Lasers and Electro-Optics Society, 2003. LEOS 2003. The 16th Annual Meeting, vol. 2, 2003 pp. 771-772.*

Townsend, Paul, "Experimental Investigation of the Performance Limits for First Telecommunications-Window Quantum Cryptography Systems", Jul. 1998, IEEE Photonics Technology Letters, vol. 10, No. 7, pp. 1048-1050.*

Karlsson, Anders, Bourenanne, Mohamed, Ljunggren, Daniel, Jonsson, Per, Hening, Alexandru, Ciscar, Juan, "Quantum Cryptography- From Single-Photon Tramsmission Key Extraction Methods to Novel Quantum Information Protocols", Jul. 1998, Evolutionary Computation, 1999. CEC 99. Proceedings of the 1999 Congress on, vol. 3, pp. 2247-2254.*

Gisin, N. et al. *Quantum cryptography*. Reviews of Modern Physics 74 (1), Jan. 2002, pp. 145-195.

Elliott, C. et al. *Quantum Cryptography in Practice*, Invited paper, ACM SIGCOMM 2003, available at http://quantum.bbn.com/dscgi/ds.py/View/Collection.

Silva, C. F. C. et al. "A Dense WDM Source Using Optical Frequency Comb Generation and Widely Tunable Injection-Locked Laser Filtering Techniques," *IEE PREP 2000 Conference on Postgraduate Research in Electronics, Photonics and Related Fields*, pp. 497-500, Nottingham, UK, Apr. 2000.

Building the Quantum Network—BBN Proposal #PO1-BBN-033, Jan. 2001, available at http://quantum.bbn.com/dscgi/ds.py/View/Collection-1O.

U.S. Appl. No. 60/470,372 filed May 14, 2003. Title: Methods and Systems for High-Data-Rate Quantum Cryptrography. Applicants: Martin Jaspan et al.

* cited by examiner

US 7,113,598 B2

METHODS AND SYSTEMS FOR HIGH-DATA-RATE QUANTUM CRYPTOGRAPHY

CROSS REFERENCE TO RELATED APPLICATIONS

This application claims priority of U.S. Provisional Patent application Ser. No. 60/470,372, entitled METHODS AND SYSTEMS FOR HIGH-DATA-RATE QUANTUM CRYPTOGRAPHY, filed on May 14, 2003, which is incorporated by reference herein.

BACKGROUND OF THE INVENTION

This invention relates generally to a system and method for key delivery using quantum cryptography, and, more particularly to a system and method for high data rate key delivery using quantum cryptography.

The transmission of information over a secure channel is an important component of many of the present commercial data exchanges. However, many of the present methods for providing secure information, usually referred to as crypto systems, rely on either the difficulty of computing certain characteristics or in securely distributing protected information, often referred to as a key, to each user. The logistics of the second approach are staggering and, therefore, most present systems use the first approach, often referred to as a public key system.

Another method of providing a secure channel between two parties, referred to as quantum cryptography (QC) or quantum key distribution (QKD), has been recently described. QKD relies on the fact that any measurements of quantities, such as phase or polarization of a photon, uniquely defines for the receiving and transmitting parties the state of the entity being measured.

Quantum cryptographic key distribution (QKD) systems transmit cryptographic key data encoded in the quantum states of individual optical photons. The benefits of such a system are that it allows secure transmission of key data over unsecured optical links with security guaranteed by the fundamental quantum properties of light rather than by computational complexity or barriers to interception. This is possible because single photons cannot be split into smaller pieces (intercepted or diverted photons simply won't arrive at the intended destination), nor can they be intercepted and consistently regenerated in identical states since their states cannot be fully characterized by single measurements, leading inevitably to errors in the states of the replacement photons. Practical systems for distribution of cryptographic keys using quantum cryptography protocols require transmission of single-photon optical signals through some medium, such as optical fiber or free space.

In a system described by C. H. Bennet and G. Brassard faint pulses of polarized light, assuring the light pulses are substantially single-photon pulses, are used to distribute key information via a low-attenuating (10–20 dB), non-depolarizing optical channel, called the "quantum channel". By utilizing the "quantum channel", two users can agree on a secret key in an impromptu manner, just before it is needed, but with provable security based on the uncertainty principle of quantum physics. To do so, the users may not exchange any material medium, but they do require a communication channel of a particular physical form, whose transmissions, owing to the uncertainty principle, cannot be eavesdropped on without disturbance.

In a system described by A. K., Ekert et al., a short-wavelength laser illuminates a suitably cut non-linear crystal. Two apertures select photon pair beams which are launched into single-mode fibers by lenses. Identical Mach-Zehnder interferometers are placed in the signal and idler arms of the apparatus. The interferometer outputs are viewed by signals and single-photon counting detectors.

In quantum cryptography, after the quantum transmission has been sent and received, the sender and receiver exchange further messages through a second channel, called the "public channel", which may be of any physical form such as an optical, microwave, or radio channel. These messages, which need not be kept secret from the eavesdropper, allow the legitimate sender and receiver to assess the extent of the disturbance of the quantum transmission by eavesdropping by another and noise sources such as photomultiplier dark current, and, if the disturbance of the quantum transmission has not been too great, to distill from the sent and received versions of the quantum transmission a smaller body of random key information which with high probability is known to the sender and receiver but to no one else.

However, the bit rate obtainable in QKD systems based on present state-of-the-art technology is limited to approximately 1000 bits/second for short transmission distances and to a significantly lower bit rate for longer transmission distances. The gating technology controlling the bit rate of existing systems is the detector technology.

TABLE 1

Estimation of QKD delivered key rate.

| | |
|---|---|
| Detector max clock rate: | 0.1–10 MHz. |
| Detector quantum efficiency: | 10 dB |
| Optical receiver loss: | 3 dB |
| Fiber Span optical losses: | 10 dB |
| "$\mu < 0.1$"[1]: | 10 dB |
| Basis guessing for BB84 protocol: | 3 dB |
| Information leakage for Error Correction and Privacy Amplification | <1 dB |
| Total bit losses: | 37 dB loss |
| Delivered Quantum Key Rate: | 20–2000 Hz |

As shown in Table I, QKD systems operating at near infrared wavelengths are compatible with standard telecommunications optical fiber and typically have a maximum key generation rate in the range of 10 bits/sec to 1000 bits/sec, depending on the total optical fiber span length.

There is a need for enhanced bit-rate QKD architectures.

SUMMARY OF THE INVENTION

The methods and systems of this invention enable enhanced bit-rate QKD fiber-based key delivery.

In one embodiment, a secure communications network of this invention includes a number of communication nodes, each of the communication nodes being connected to a quantum channel. At least one of the communication nodes (a sending node) includes a photon supplying system capable of supplying a succession of substantially single photons spaced a part in time, a modulator system capable of modulating a characteristic property of each one of the substantially single photons, a multiplexing system capable of assembling the succession of substantially single photons in a predetermined order, and a transmission/coupling system capable of transmitting/coupling the assembled succession of substantially single photons over the quantum channel. At least another of the communication nodes (a receiving node) includes a receiving system capable of receiving at least some of the assembled succession of substantially single photons, an analyzing system capable of analyzing the characteristic property of the received assembled succession of substantially single photons, a demultiplexing system capable of separating the received assembled succession of substantially single photons into a number of separated successions of substantially single photons, and, a number of detector systems, each one of the detector systems being capable of detecting one separated succession of the successions of substantially single photons.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Methods and systems that enable enhanced bit-rate QKD fiber-based key delivery are disclosed hereinbelow.

Figure 1A:
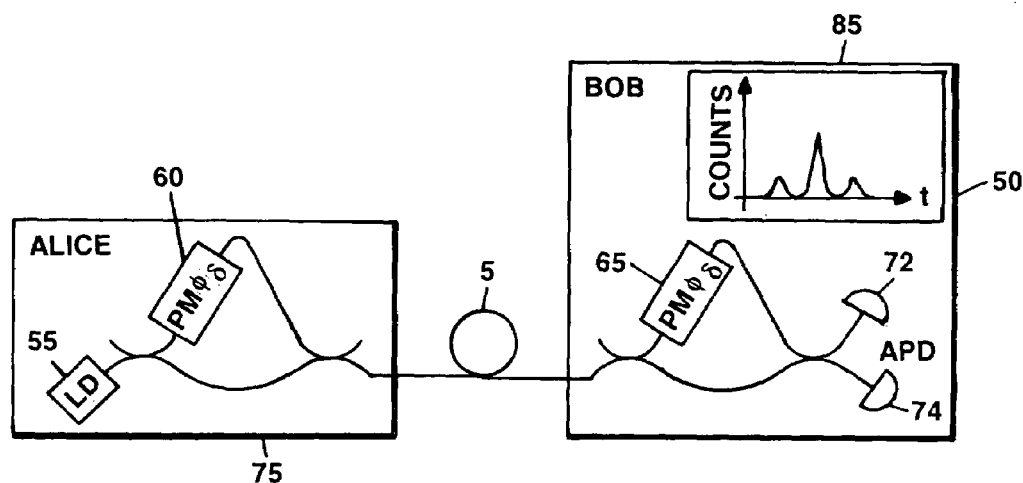
FIGS. 1a, 1b, 1c, 1d are schematic graphical representations of a QKD systems of the prior art.
Figure 1B:
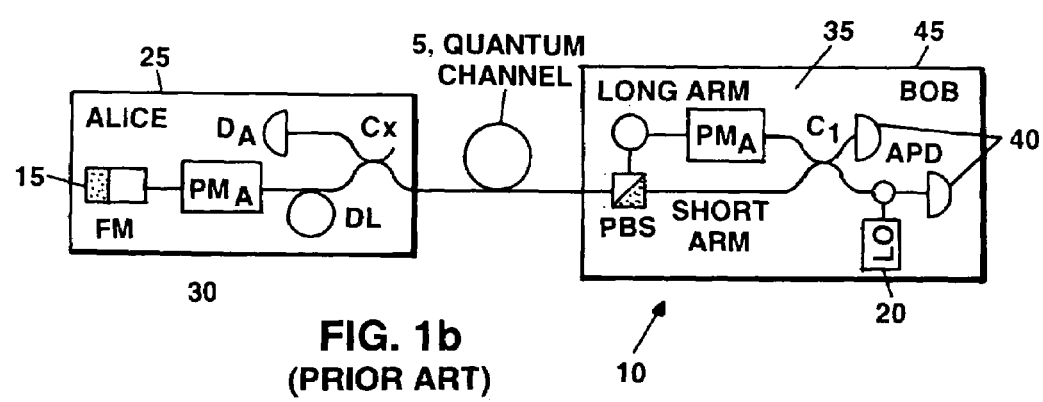
Figure 1C:
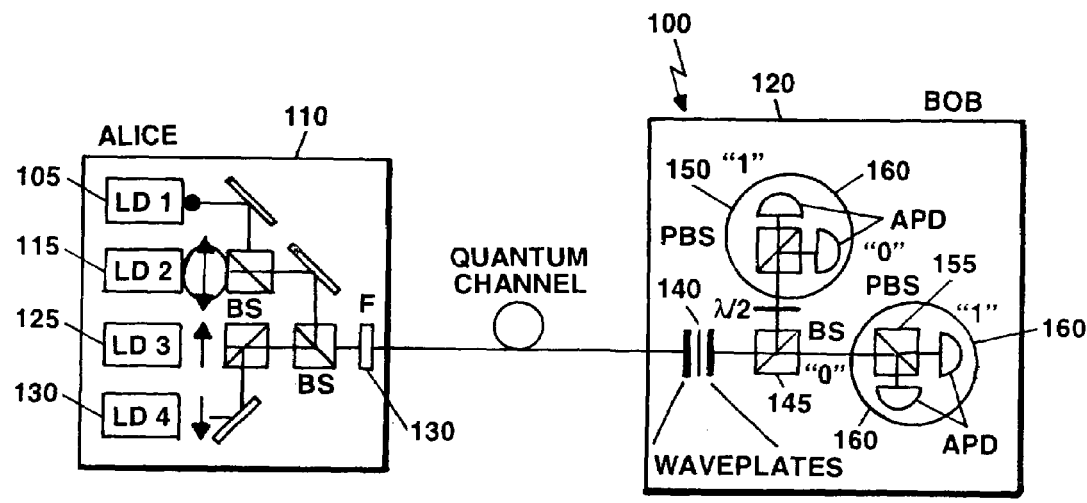
Figure 1D:
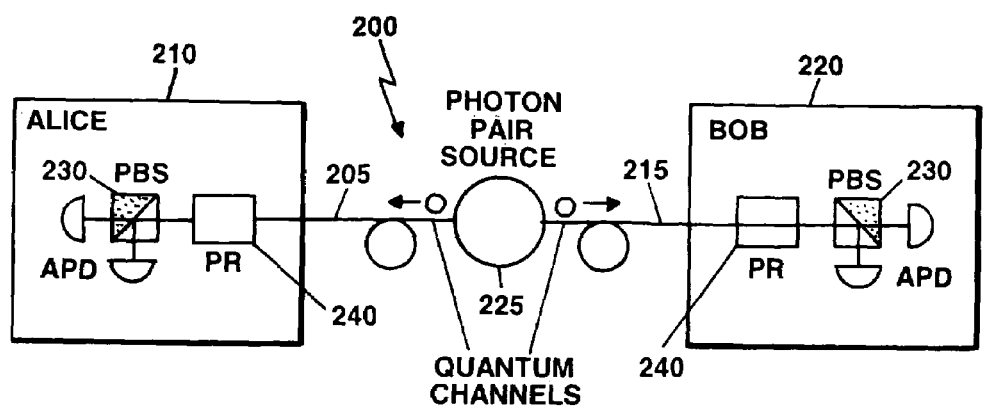
Figure 2:
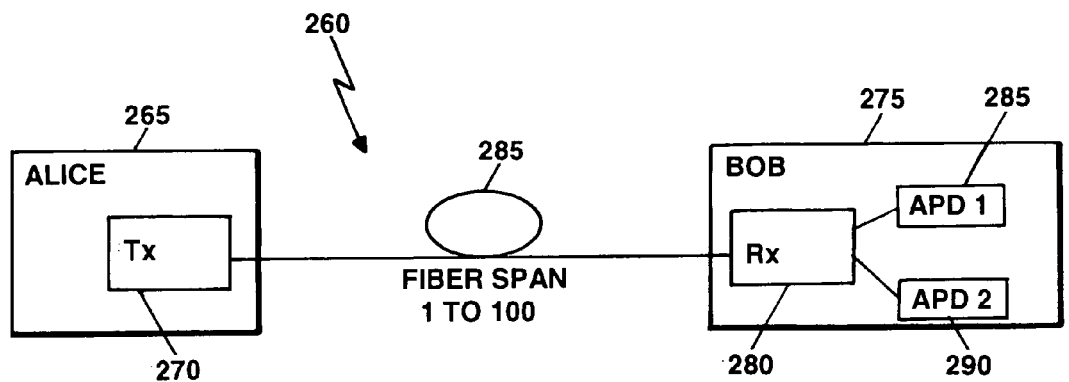
FIG. 2 is a schematic graphical representations of another QKD system of the prior art.
Figure 3:
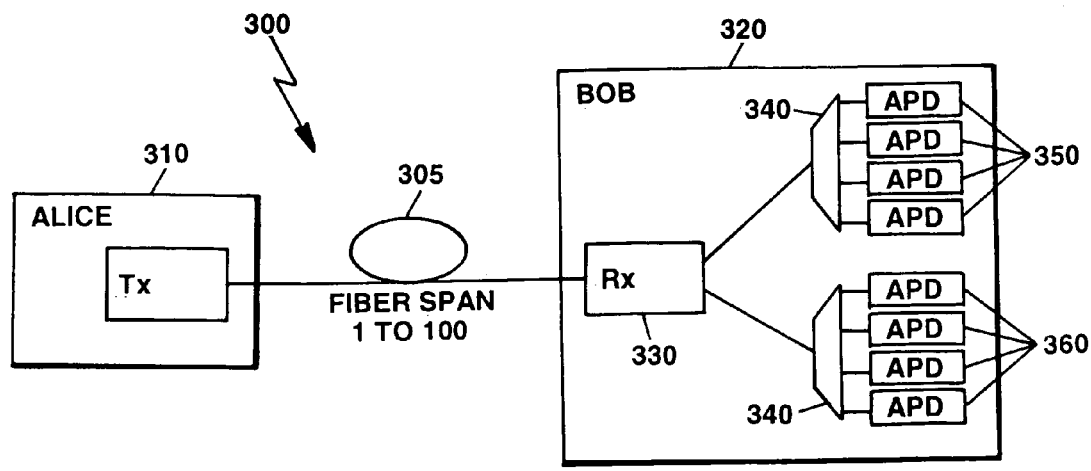
FIG. 3 is a schematic graphical representation of an embodiment of a QKD system of this invention.

In order to better understand this invention an embodiment of a system of this invention, shown in FIG. 3, is compared to QKD systems of the prior art, shown in FIGS. 1a, 1b, 1c and 1d, and FIG. 2.

Prior Art

Referring to FIG. 1a, two nodes 75 and 85 of a prior art communication network 50 are connected to a quantum channel 5. At a sending node 75, labeled Alice, a photon supplying system 55 supplies substantially single photons that are phase modulated by a modulator system 60 (a Mach-Zender interferometer with unequal path lengths in FIG. 1a) and provided to the quantum channel 5. At the Receiving node 85, labeled Bob, a receiving/analyzing system 65 can receive and analyze the photons sent by Alice. The detector systems 72, 74 can detect the photons sent by Alice. Photons are detected at detector system 72 or/and detector system 74 depending on the length of the path traveled by the photon supplied by the photon supplying system 55. (FIGS. 1a–1d were disclosed in N. Gisin et al, *Quantum cryptography*, Rev. Mod. Phys., Vol. 74, No. 1, pp. 145–96, January 2002, which is incorporated by reference herein.)

FIG. 1b shows two nodes 25 and 45 of another prior art communication network 10 connected to the quantum channel 5. Referring to FIG. 1b, photon are supplied by the laser source 20 and the Faraday mirror 15. In the configuration of FIG. 1b, the Faraday mirror 15 is considered part of the photon supplying system at node 25, labeled Alice. At the Receiving node 45, labeled Bob, the receiving and analyzing systems are combined and the combined system 35 includes a polarization beamsplitter and a phase modulator. The detector systems 40 can detect the photons sent by Alice.

FIG. 1c shows two nodes 110 and 120 of yet another prior art communication network 100 connected to the quantum channel 5. At one node 110, labeled Alice, four laser diodes 105, 115, 125, 130 each emitting a short photon pulse of different polarization—for example, −45 degrees, 0 degrees, +45 degrees, and 90 degrees-constitute part of the photon supplying system. A triggering system that triggers a single laser diode constitutes the modulation system. An attenuator 130 that attenuates the photon pulse completes the photon supplying system. At the other node 120, labeled Bob, a set of waveplates 140 constitute the receiving system. A symmetric beamsplitter 145 and two polarizing beamsplitters 150, 155 constitute the analyzing system. The detector systems 160 can detect the photons sent by Alice. In the network of FIG. 1c encodes "quantum bit" using the polarization of the photons, while in the networks of FIGS. 1c, 1d the information is encoded in the phase.

FIG. 1d shows two nodes 210 and 220 of still another prior art communication network 200 connected to two quantum channels 205, 215. A two-photon source 225 emits pairs of entangled photons, one photon towards each of the nodes 210, 220, labeled Alice and Bob. Each photon is analyzed with a polarizing beamsplitter 230. The photon whose orientation can be changed rapidly by a polarization rotator 240. The receiving/analyzing system in each of the nodes is similar to that used for polarization coding in FIG. 1c. The detector systems 250 can detect the entangled photons at each node 210, 220. It should be noted that the system of this invention is not limited to only these four embodiments.

In order to facilitate comparison and understanding of the present invention, a schematic representation of prior art systems such as the prior art systems of FIGS. 1a and 1b is shown in FIG. 2. Referring to FIG. 2, the two nodes 265 and 275 of the prior art communication network 260 are connected to the quantum channel 285. At one node 265, labeled Alice, a transmission system 270, including a photon supplying system, a modulator system and a transmission/coupling system and, is capable of transmitting/coupling a succession of substantially single photons over the quantum channel 285. At the receiving node 275, labeled Bob, a receiving/analyzing system 280 can receive and analyze the photons sent by Alice. The detectors 285, 290 can detect the photons sent by Alice. Photons are detected at one detector 285 or/and the other detector 290 depending on the length of the path traveled by the photon supplied by the photon supplying system at the sending node 265, Alice. The detectors 285, 290 perform substantially the same function as the detectors 72 and 74 in FIG. 1a.

In principle, the above systems would require the use of single photon states. Since these states are difficult to realize experimentally, these states are sometimes approximated by coherent states with an ultra-low mean photon number, which can easily be realized using standard semi-conductor lasers and calibrated attenuators. However, this approximation suffers from a small, but non-zero, probability of generating more than one photon. Therefore, there is great interest in single photon sources (also called "photon guns"), although single photon sources are not readily available. Hereinafter, both coherent states with an ultra-low mean photon number and single photon sources are referred to as sources of substantially single photons.

The detectors in all the above examples are typically avalanche photodiodes (APDs). The detector technology limits the achievable bit rate of existing systems.

Embodiments of Systems of this Invention

In one embodiment of the system of this invention, a node of the communication network includes, in addition to the conventional components described above, a multiplexing system capable of temporally and/or spectrally multiplexing information, which is then transmitted over the quantum channel (in one embodiment, a fiber optic transmission line). (The temporal and/or spectral multiplexing can also be described as assembling a stream of substantially single photons in a predetermined order.) Another node (the receiving node) includes, in addition to the conventional components described above, a demultiplexing system capable of demultiplexing the information (separating the received assembled stream of substantially single photons into a number of separated streams of substantially single photons). Each separated (demultiplexed) stream of information is provided to one detector of a group of detectors. FIG. 3 schematically shows an embodiment of a system of this invention in which, at the receiving node, the two detectors (in one embodiment APDs) of FIG. 2 are replaced by 2 sets of four multiplexed detectors (in one embodiment APDs). Referring to FIG. 3, two nodes 310 and 320 of a communication network 300 of this invention connected to the quantum channel 305. The receiving node 320, labeled Bob, includes a receiving/analyzing system 330, a demultiplexing system 340 capable of separating a succession of substantially single photons into a number of separated succession of substantially single photons, and a number of detectors in two groups of detectors 350, 360. Photons are detected at one detector group 350 or/and the other detector group 360 depending on the length of the path traveled by the photon supplied by the photon supplying system at the sending node 210, labeled Alice. The data rate (key delivery rate) of the system of FIG. 3 is substantially four times faster than the rate of the system of FIG. 2.

Figure 4A:
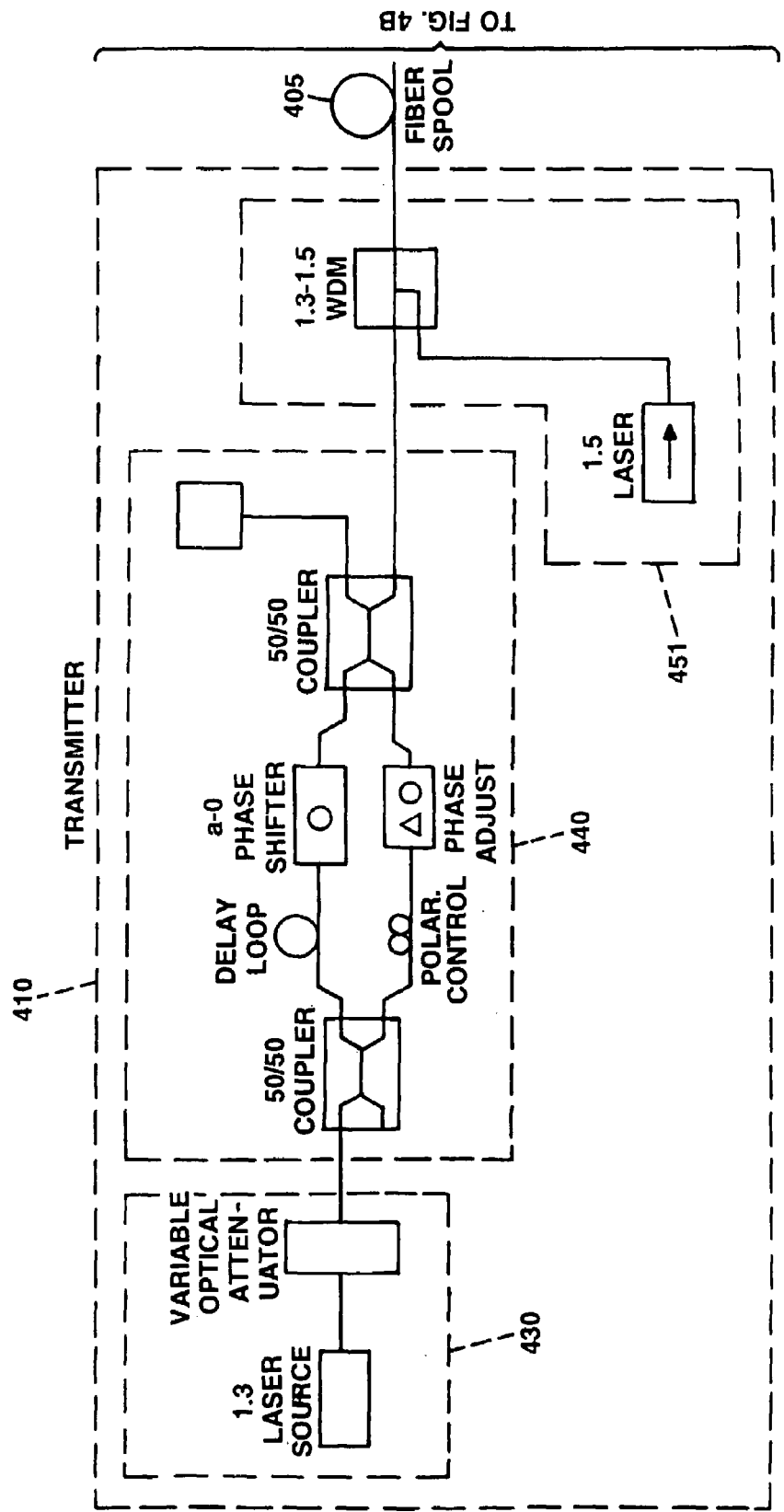
FIG. 4 is a schematic graphical representation of an embodiment of a QKD architecture of this invention.
Figure 4B:
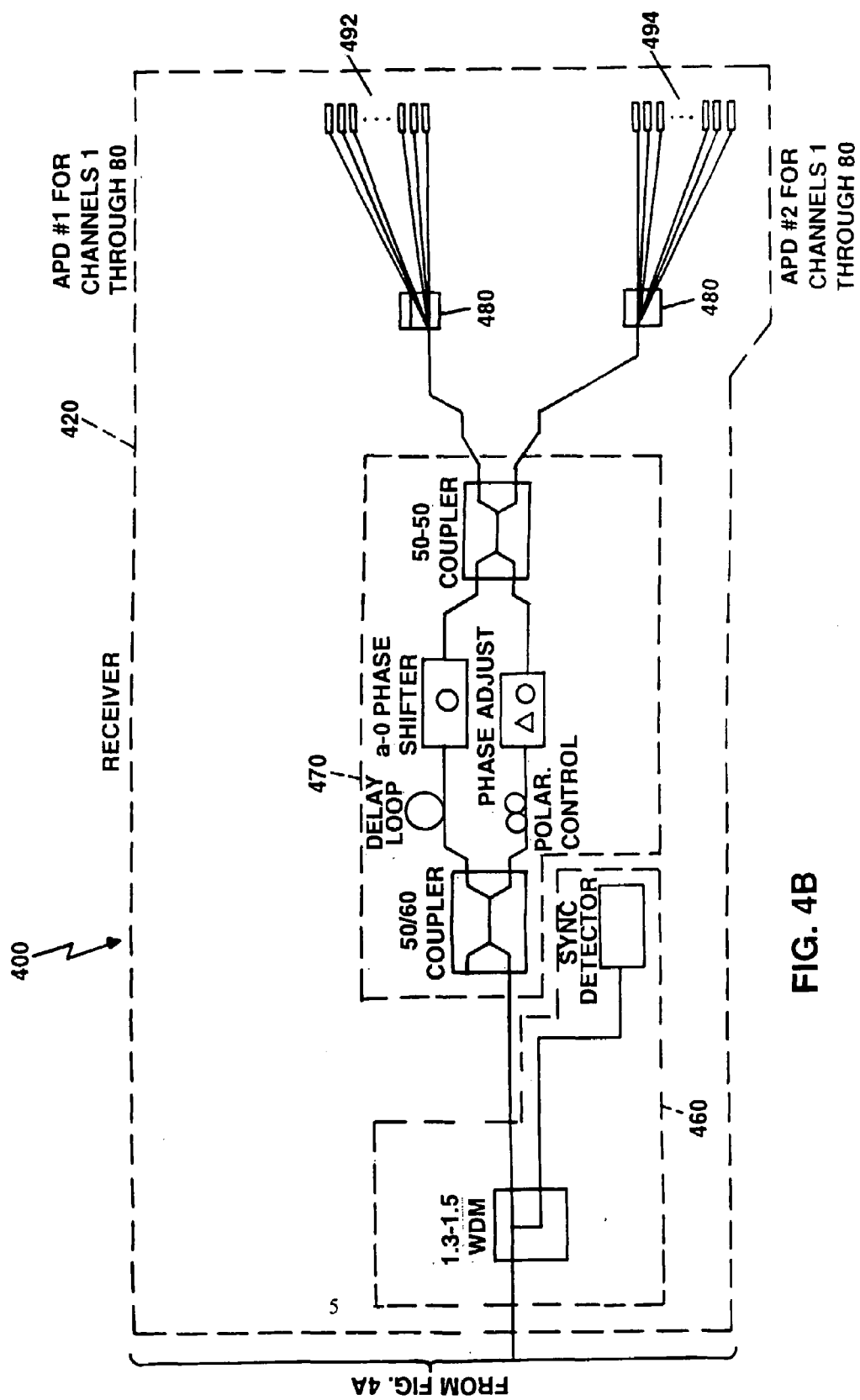

FIG. 4 is a schematic graphical representation of an embodiment of a QKD architecture of this invention. Shown in FIG. 4 are two nodes 410 and 420 of an embodiment 400 of the communication network of this invention connected to the quantum channel 405, (A prior art system having only the conventional components shown of FIG. 3 is described in Elliott, Pearson, Troxel, *Quantum Cryptography in Practice*, Invited paper, ACM SIGCOMM 2003, available at http://quantum.bbn.com/dscgi/ds.py/View/Collection-109, which is hereby incorporated by reference.) In this embodiment, the transmitting node 410 includes a photon supplying system 430 capable of supplying a succession of substantially single photons spaced a part in time, a modulator system 440 capable of modulating a characteristic property (a Mach-Zender interferometer with unequal path lengths), the phase in this embodiment, of each one of the substantially single photons, a multiplexing system (not shown) capable of assembling the succession of substantially single photons in a predetermined order and a transmission/coupling system 450 capable of transmitting/coupling the assembled succession of substantially single photons over the quantum channel 405. The receiving node 420 includes a receiving system 460 capable of receiving at least some of the assembled succession of substantially single photons, an analyzing system 470 (a Mach-Zender interferometer with unequal path lengths) capable of analyzing the characteristic property of the received assembled succession of substantially single photons, a demultiplexing 480 system capable of separating the received assembled plurality of substantially single photons into a number of separated successions of substantially single photons; and, two detector systems 492, 494.

In the embodiment shown in FIG. 4, the succession of substantially single photons can be multiplexed spectrally (in wavelength) or/and in time. Multiplexing in wavelength can be achieved, in one embodiment, but not limited to, using a comb laser source (for example, but not limited to, the comb laser source described in C. F. C. Silva, O. P. Gough, S. Bennett, L. N. Langley and A. J. Seeds, "A Dense WDM Source Using Optical Frequency Comb Generation and Widely Tunable Injection-Locked Laser Filtering Techniques," *IEE PREP* 2000 *Conference on Postgraduate Research in Electronics, Photonics and Related Fields*, pp. 497–500, Nottingham, UK, April 200 and references therein). In one embodiment, individual wavelengths are selected by switches or by direct modulation of the individual sources.

Figure 5:
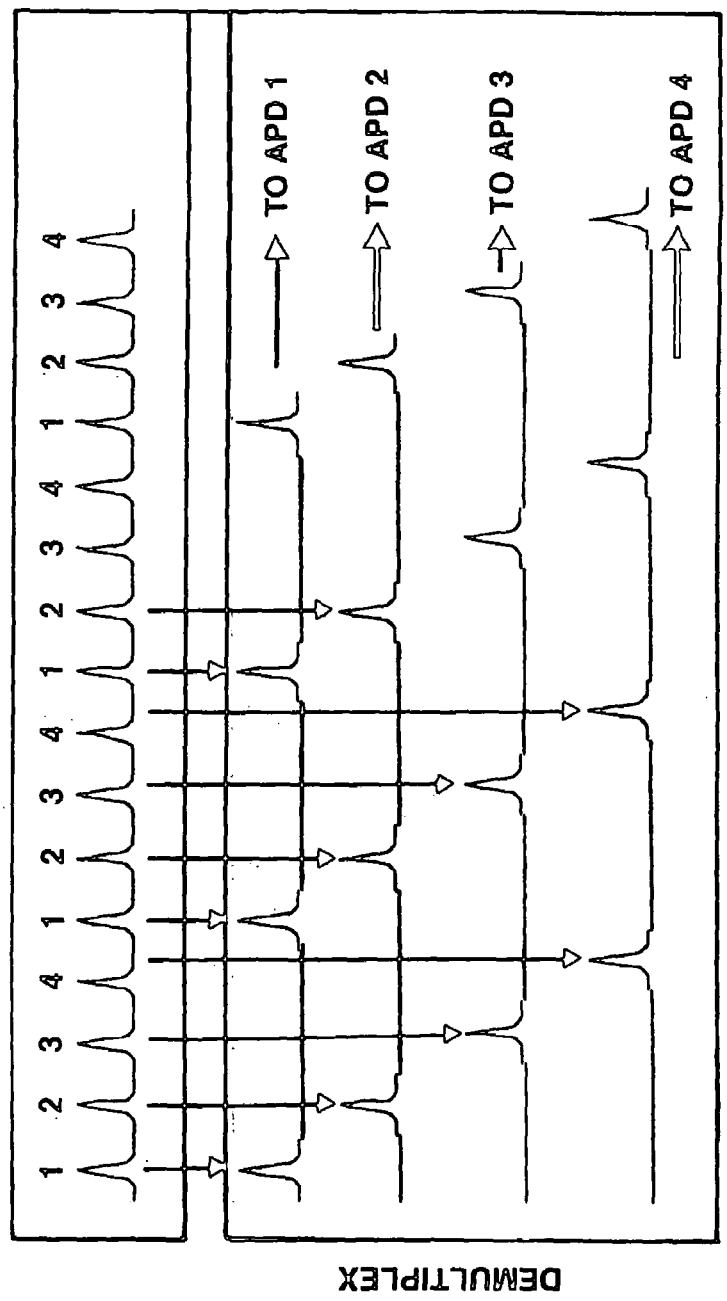
FIG. 5 represents a schematic graphical representation of time division multiplexing as used in this invention.

Multiplexing through temporal division (time multiplexing), shown schematically in FIG. 5, can be achieved, in one embodiment, but not limited to, by clocking the photon source (laser) at a higher rate. Conventional laser diodes exist at rates of 2.5 GHz, 10 GHz, and 40 GHz.

If the succession of substantially single photons is multiplexed spectrally, at the receiving node (for example, node 420 in FIG. 4), demultiplexing the received assembled succession of substantially single photons comprises, in one embodiment, separating the received assembled succession of substantially single photons spatially. Optical filters (conventional optical telecom components such as thin-film filters or arrayed waveguides (AWGs)) can be used, in one embodiment, but not limited to, for passive demultiplexing of the wavelength multiplexed received assembled succession of substantially single photons.

If the succession of substantially single photons is temporally multiplexed, at the receiving node, the temporally multiplexed succession of substantially single photons can be separated, in one embodiment, but not limited to, by a series of optical switches. An embodiment of the separation in time is shown in FIG. 5. In one embodiment, the active demultiplexing can be accomplished with an optical switch operating to deliver photons to the detectors (APDs, in one embodiment) in consecutive order. In that embodiment, optical switches operating with clock speeds of substantially 10–100 MHz are utilized.

In another embodiment of the system of this invention, the succession of substantially single photons is multiplexed both spectrally and temporally. In that embodiment, the received assembled succession of substantially single photons is separated both spatially and in time.

In one detailed embodiment of the QKD system of this invention shown in FIG. 4, each detector system 492, 494 has an array of 4000 detectors, corresponding to frequency multiplexing of 80 separate wavelengths, with each wavelength temporally multiplexed with 50 pulses.

While, in the embodiment shown in FIG. 4, the information is encoded in the phase relationship of the substantially single photons, the conventional components of the system of this invention could, in another embodiment, be similar to those of FIG. 1c, in which the information is encoded in the polarization of the substantially single photons. In the system of this invention utilizing polarization encoding of the substantially single photons, each detector in FIG. 1c would be replaced by a group of detectors.

Similarly, while in the embodiment shown in FIG. 4, the information is encoded in the phase relationship of the substantially single photons, the conventional components of the system of this invention could, in another embodiment, be similar to those of FIG. 1d, in which the information is encoded in polarization entangled substantially single photon pairs. In the system of this invention utilizing polarization entangled substantially single photon pairs, each detector in FIG. 1d would be replaced by a group of detectors.

Operation of an embodiment of the system of this invention in which the succession of substantially single photons is multiplexed spectrally includes the following steps. A succession of substantially single photons is transmitted over the quantum channel, where each substantially single photon has a predetermined wavelength, each predetermined wavelength is located in a band of wavelengths from a number of bands of wavelength, and, each band of wavelengths is located in the bandwidth of the quantum channel. At least some of the substantially single photons from the succession of substantially single photons are received at a receiving node. The received succession of substantially single photons is spatially separated into a number of spatially separated successions of substantially single photons, each spatially separated succession of substantially single photons including substantially single photons having a wavelength located in one band of wavelengths from the number of bands of wavelength. Each spatially separated succession of substantially single photons is detected by one detector.

Operation of an embodiment of the system of this invention in which the succession of substantially single photons is temporally multiplexed includes the following steps. A succession of substantially single photons, the substantially single photons being spaced apart in time, is transmitted over the quantum channel. At least some of the substantially single photons from the succession of substantially single photons are received at a receiving node. The received substantially single photons are separated in time into a number of temporally separated successions of substantially single photons. Each temporally separated succession of substantially single photons is detected by one detector.

Operation of an embodiment of the system of this invention in which the succession of substantially single photons is temporally and spectrally multiplexed includes a combination of the above described methods. The received succession of substantially single photons is spatially separated into a number of spatially separated successions of substantially single photons, each spatially separated succession of substantially single photons including substantially single photons having a wavelength located in one band of wavelengths from the number of bands of wavelength. Each spatially separated succession of substantially single photons is separated in time into a number of temporally separated successions of substantially single photons. Each of the temporally separated and spatially separated successions of substantially single photons is detected by one detector.

It should be noted that, although the above disclosed embodiments and above reviewed prior art utilize several methods for encoding the key information (sometimes called the "qubits"), other encoding methods are possible and are within the scope of this invention. It should also be noted that, although the above disclosed embodiments are shown utilizing APDs, the methods and systems of this invention do not depend on any one detector technology.

Although the invention has been described with respect to various embodiments, it should be realized this invention is also capable of a wide variety of further and other embodiments within the spirit and scope of the appended claims.

What is claimed is:

1. A secure communications network comprising:
   a plurality of communication nodes, each of said communication nodes being connected to a quantum channel;
   one sending node from said plurality of communication nodes comprising:
      a photon supplying system capable of supplying a plurality of substantially single photons spaced a part in time;
      a modulator system capable of modulating a characteristic property of each one of the substantially single photons;
      a multiplexing system capable of assembling the plurality of substantially single photons in a predetermined order;
      a transmission/coupling system capable of transmitting/coupling the assembled plurality of substantially single photons over the quantum channel; and,
   a receiving node from said plurality of communication nodes comprising:
      a receiving system capable of receiving at least some of the assembled plurality of substantially single photons;
      an analyzing system capable of analyzing the characteristic property of the received assembled plurality of substantially single photons;
      a demultiplexing system capable of separating the received assembled plurality of substantially single photons into a number of separated pluralities of substantially single photons; and,
      a plurality of detector systems, each one of said detector systems being capable of detecting one separated plurality of said pluralities of substantially single photons at said receiving node;
      said one sending node being capable of transmitting said assembled plurality of substantially single photons to said receiving node;
   said multiplexing system in combination with said demultiplexing system being capable of increasing a data rate of transmission over the quantum channel from said one sending node to said receiving node by utilizing said plurality of detector systems at said receiving node.

2. The secure network of claim 1 wherein the characteristic property is a phase of each one of the substantially single photons.

3. The secure network of claim 1 wherein the characteristic property is a polarization state of each one of the substantially single photons.

4. The secure network of claim 1 wherein each plurality from number of pluralities of substantially single photons has substantially one wavelength.

5. The secure network of claim 4 wherein each plurality from number of pluralities of substantially single photons is separated with respect to time of arrival.

6. The secure network of claim 5 wherein said demultiplexing system comprises an optical switch operating at clock speeds of substantially 10 to 100 Mhz.

7. An apparatus for distributing cryptographic key information, the apparatus comprising:
   a photon supplying system capable of supplying a plurality of substantially single photons spaced a part in time, each one all the substantially single photons having substantially one wavelength;

a modulator system capable of modulating a characteristic property of each one of the substantially single photons;

a multiplexing system capable of assembling the plurality of substantially single photons in a predetermined order; and, a transmission/coupling system capable of transmitting/coupling the assembled plurality of substantially single photons over the quantum channel to one receiving node;

wherein the plurality of substantially single photons comprise the source of the cryptographic key information transmitted from the apparatus to said one receiving node; and wherein said multiplexing system, when combined with a demultiplexing system and a plurality of detector systems at said one receiving node, is capable of increasing a data rate of transmission over the quantum channel from the apparatus to said one receiving node by utilizing said plurality of detector systems at said one receiving node.

8. The apparatus of claim 7 wherein the characteristic property is a phase of each one of the substantially single photons.

9. The apparatus of claim 7 wherein the characteristic property is a polarization state of each one of the substantially single photons.

10. An apparatus for receiving cryptographic key information, the apparatus comprising:

a receiving system capable of receiving a first plurality of substantially single photons from a transmitting system;

an analyzing system capable of analyzing a characteristic property of the first plurality of substantially single photons;

a demultiplexing system capable of separating the first plurality of substantially single photons into a number of second pluralities of substantially single photons; and, a plurality of detector systems, each one of said detector systems being capable of detecting one plurality of said second pluralities of substantially single photons;

wherein the plurality of substantially single photons comprise the source of the cryptographic key information transmitted from the transmitting system to said receiving system; and wherein said demultiplexing system, when used in combination with a multiplexing system at the transmitting system, is capable of increasing a data rate of transmission over the quantum channel from the transmitting system to said receiving system by utilizing said plurality of detector systems.

11. The apparatus of claim 10 wherein the characteristic property is a phase of each one of the substantially single photons.

12. The apparatus of claim 10 wherein the characteristic property is a polarization state of each one of the substantially single photons.

13. The apparatus of claim 10 wherein each plurality from number of the second pluralities of substantially single photons has substantially one wavelength.

14. The apparatus of claim 13 wherein each plurality from number of the second pluralities of substantially single photons is separated with respect to time of arrival.

15. The apparatus of claim 14 wherein said demultiplexing system comprises an optical switch operating at clock speeds of substantially 10 to 100 Mhz.

16. A method for obtaining a high data rate in quantum key distribution, the method comprising the steps of:

transmitting, from a transmitting node and over a quantum channel, a first plurality of substantially single photons in a predetermined pattern;

receiving, at a receiving node, at least some of the first plurality of substantially single photons;

separating, at the receiving node, the received plurality of substantially single photons into a number of second pluralities of substantially single photons;

detecting, utilizing a plurality of detector systems, each plurality from the number of second pluralities of substantially single photons;

using demultiplexing and the plurality of detector systems at the receiving node, in combination with multiplexing, in order to increase the data rate of transmission over the quantum channel from the transmitting node to the receiving node.

17. A method for obtaining a high data rate in quantum key distribution, the method comprising the steps of:

transmitting, from a transmitting node and over a predetermined channel, a first plurality of substantially single photons spaced apart in time, each substantially single photon having a predetermined wavelength, each predetermined wavelength located in a band of wavelengths from a plurality of bands of wavelength, each band of wavelengths located in a bandwidth of the predetermined channel;

receiving, at a receiving node, at least some of the substantially single photons from the plurality of substantially single photons;

spatially separating, at the receiving node, the received plurality of substantially single photons into a number of second pluralities of substantially single photons, each second plurality of substantially single photons including substantially single photons having a wavelength located in one band of wavelengths from the plurality of bands of wavelength;

separating in time, at the receiving node, each second plurality of substantially single photons, constituting a number of separated in time third pluralities of substantially single photons;

detecting, at the receiving node, utilizing a plurality of detector systems, each third plurality of substantially single photons; and using demultiplexing and the plurality of detector systems, in combination with multiplexing, in order to increase the data rate of transmission over the predetermined channel from the transmitting node to the receiving node.

18. A method for obtaining a high data rate in quantum key distribution, the method comprising the steps of:

transmitting, from a transmitting node and over a predetermined channel, a first plurality of substantially single photons, each substantially single photon having a predetermined wavelength, each predetermined wavelength located in a band of wavelengths from a plurality of bands of wavelength, each band of wavelengths located in a bandwidth of the predetermined channel;

receiving, at a receiving node, at least some of the substantially single photons from the plurality of substantially single photons;

spatially separating, at the receiving node, the received plurality of substantially single photons into a number of second pluralities of substantially single photons, each second plurality of substantially single photons including substantially single photons having a wavelength located in one band of wavelengths from the plurality of bands of wavelength;

detecting, at the receiving node, utilizing a plurality of detector systems, each spatially separated second plurality of substantially single photons; and using demultiplexing and the plurality of detector systems, in combination with multiplexing, in order to increase the data rate of transmission over the predetermined channel from the transmitting node to the receiving node.

19. A method for obtaining a high data rate in quantum key distribution, the method comprising the steps of:

transmitting, from a transmitting node and over a predetermined channel, a plurality of substantially single photons spaced apart in time;

receiving, at a receiving node, at least some of the substantially single photons from the plurality of substantially single photons;

separating in time, at the receiving node, the received at least some of the substantially single photons;

detecting, at the receiving node, utilizing a plurality of detector systems, the separated in time at least some of the substantially single photons; and using demultiplexing and the plurality of detector systems, in combination with multiplexing, in order to increase the data rate of transmission over the predetermined channel from the transmitting node to the receiving node.

20. A secure communications network comprising:

a plurality of communication nodes, each of said communication nodes being connected to a quantum channel;

at least one photon supplying system capable of supplying a pair of pluralities of substantially single photons spaced a part in time;

one multiplexing system capable of assembling each one plurality of the pair of pluralities of substantially single photons in a predetermined order;

one pair of communication nodes from said plurality of communication nodes, each communication nodes from said one pair comprising:

a receiving/analyzing system capable of receiving at least some of one plurality of the pair of assembled pluralities of substantially single photons and capable of analyzing the characteristic property of the received assembled plurality of substantially single photons;

a demultiplexing system capable of separating the received assembled plurality of substantially single photons into a number of pluralities of substantially single photons; and, a plurality of detector systems, at said each communication node, one of said detector systems being capable of detecting one plurality of said pluralities of substantially single photons;

wherein the assembled pair of pluralities of substantially single photons comprises the source of the cryptographic key information transmitted from one communication node from the pair of communication nodes to another communication node from the pair of communication nodes; said one multiplexing system in combination with each said demultiplexing system and said plurality of detector systems in each one of the communication nodes from said one pair being capable of increasing a data rate of transmission over the quantum channel from one communication node from the pair of communication nodes to another communication node from the pair of communication nodes.

* * * * *